US011992954B2

United States Patent
Dai et al.

(10) Patent No.: US 11,992,954 B2
(45) Date of Patent: May 28, 2024

(54) SAFE OPERATION OF A ROBOTIC SYSTEM

(71) Applicant: ABB Schweiz AG, Baden (CH)

(72) Inventors: Fan Dai, Zwingenberg (DE); Rene Kirsten, Fernwald (DE); Bjoern Matthias, Bad Schoenborn (DE)

(73) Assignee: ABB Schweiz AG, Baden (CH)

( * ) Notice: Subject to any disclaimer, the term of this patent is extended or adjusted under 35 U.S.C. 154(b) by 535 days.

(21) Appl. No.: 17/211,895

(22) Filed: Mar. 25, 2021

(65) Prior Publication Data

US 2021/0205994 A1  Jul. 8, 2021

Related U.S. Application Data

(63) Continuation of application No. PCT/EP2018/076612, filed on Oct. 1, 2018.

(51) Int. Cl.
*B25J 9/16* (2006.01)
*B25J 13/08* (2006.01)
(Continued)

(52) U.S. Cl.
CPC .............. *B25J 9/1676* (2013.01); *B25J 13/08* (2013.01); *G05B 19/4155* (2013.01);
(Continued)

(58) Field of Classification Search
CPC ........ B25J 9/1676; B25J 13/08; B25J 9/1674; B25J 13/086; G05B 19/4155;
(Continued)

(56) References Cited

U.S. PATENT DOCUMENTS 10,503,143 B1 * 12/2019 Polic ................ G05B 19/406
11,174,989 B2 * 11/2021 Böhning ................ F16P 3/144
(Continued)

FOREIGN PATENT DOCUMENTS

DE    10324628 A1 * 12/2004 ............ B25J 9/1674
DE    10324628 A1    12/2004
(Continued)

OTHER PUBLICATIONS

ISO, "Robots and robotic devices—Safety requirements for industrial robots—Part 2: Robot systems and integration," ISO 10218-2, Jul. 2011, pp. 1-80, ISO 2011, Switzerland.

*Primary Examiner* — Jason Holloway
*Assistant Examiner* — Benjamin J Brosh
(74) *Attorney, Agent, or Firm* — Leydig, Voit & Mayer, Ltd.

(57) ABSTRACT

A robotic system includes: at least one robot; a robot controller for controlling an operation of the at least one robot; a robot sensor system with at least one robot sensor, the robot sensor system being coupled to the robot controller to detect a presence of an object in a robot safety zone, which robot safety zone at least partially surrounds the at least one robot; and at least one automated vehicle for supplying the at least one robot. The at least one vehicle has at least one vehicle sensor for detecting a presence of an object in a vehicle safety zone, which vehicle safety zone at least partially surrounds the at least one vehicle. The robot controller determines an entry of the at least one vehicle into the robot safety zone. The robot controller adjusts at least a part of the robot safety zone.

18 Claims, 6 Drawing Sheets

(51) Int. Cl.
    *G05B 19/4155*     (2006.01)
    *G08C 17/02*     (2006.01)
    *G05B 19/418*     (2006.01)

(52) U.S. Cl.
    CPC ........ G08C 17/02 (2013.01); *G05B 19/41895* (2013.01); *G05B 2219/37631* (2013.01); *G05B 2219/40339* (2013.01)

(58) Field of Classification Search
    CPC .... G05B 19/41895; G05B 2219/37631; G05B 2219/40339; G05B 2219/39102; G05B 2219/39118; G05B 2219/39175; G05B 2219/40202; G05B 2219/40203; G05B 2219/43202; G05B 19/41815; G05B 19/0461; G08C 17/02; Y02P 90/02; Y02P 90/60
    See application file for complete search history.

(56) References Cited

U.S. PATENT DOCUMENTS

| | | | |
|---|---|---|---|
| 2013/0008996 A1* | 1/2013 | Lehrieder | B65H 19/126 242/563 |
| 2017/0144307 A1* | 5/2017 | Rublee | B25J 19/021 |
| 2018/0222052 A1* | 8/2018 | Vu | B25J 9/1666 |
| 2019/0105788 A1* | 4/2019 | Pilz | B25J 9/1674 |

FOREIGN PATENT DOCUMENTS

| | | | | |
|---|---|---|---|---|
| DE | 102016004889 A1 | 10/2017 | | |
| EP | 2353799 A2 | 8/2011 | | |
| JP | H 01222889 A | 9/1989 | | |
| JP | 2000263489 A | * 9/2000 | ............. | B25J 19/06 |

\* cited by examiner

SAFE OPERATION OF A ROBOTIC SYSTEM

CROSS-REFERENCE TO PRIOR APPLICATION

This application is a continuation of International Patent Application No. PCT/EP2018/076612, filed on Oct. 1, 2018, the entire disclosure of which is hereby incorporated by reference herein.

FIELD

Generally, the present invention relates to the field of industrial process automation based on a robot and/or based on a robotic system. Particularly, the invention relates to a robotic system and to a method of operating a robotic system. The invention further relates to a program element and to a computer readable medium.

BACKGROUND

Working areas of industrial robots and/or robotic systems are usually secured with fences and corresponding safety control to ensure safe operation of the robot and/or the robotic system. Other robotic systems, however, are based on fenceless operation, e.g. involving safety sensors like light curtain, laser scanners, or the like, and safety control that may trigger a reaction of the robot, e.g. when an object, particularly a human, enters one or more zones or spaces observed by the safety sensors. These observed zones or spaces are usually referred to as safety zones.

Usually, both the safety zone as well as the corresponding reaction when an object is detected therein are pre-defined and are part of a so-called safety configuration of the robotic system, which can, for example, be verified according to machine safety standards at start-up of the robotic system and/or of a robot application, and which typically remain unchanged during operation of the robotic system.

A robot and/or robotic system may, for example, comprise a robot arm, e.g. for mounting parts to a product to be assembled and/or for performing any action or operation. Further, the robot and/or the robot arm can be mounted on a track motion that can be controlled by a robot controller, such that the robot and/or the robot arm can be moved along the track motion. A corresponding safety configuration of the robotic system may comprise a safety zone that is moved with along an axis of the track motion relative to a world coordinate system.

Further, robotic systems may comprise one or more automated vehicles and/or transport vehicles, such as e.g. automated guided vehicles (also referred to as AGVs hereinafter) for feeding and/for supplying the robot and/or the robotic system, e.g. with materials and/or parts used to perform an operation with the robot. For instance, AGVs can be used to feed a robot station of the robotic system, wherein the AGVs may be docked to the robot station at a pre-defined position and may keep unmoved while the robot is performing the operation on it.

Accordingly, in scenarios where the robot is performing an operation, e.g. moving the robot arm, and a transport vehicle, such as an AGV, is moving within the safety zone of the robot, operation of the robot may be terminated according to the safety control of the robotic system as a result of the fixed or static safety zone of the robot. Such termination of the operation of the robot, in turn, may lead to a downtime of the robotic system.

SUMMARY

In an embodiment, the present invention provides a robotic system, comprising: at least one robot; a robot controller configured to control an operation of the at least one robot; a robot sensor system with at least one robot sensor, the robot sensor system being coupled to the robot controller and configured to detect a presence of an object in a robot safety zone, which robot safety zone at least partially surrounds the at least one robot; and at least one automated vehicle configured to supply the at least one robot, wherein the at least one vehicle comprises at least one vehicle sensor configured to detect a presence of an object in a vehicle safety zone, which vehicle safety zone at least partially surrounds the at least one vehicle, wherein the robot controller is configured to determine an entry of the at least one vehicle into the robot safety zone, and wherein the robot controller is configured to adjust at least a part of the robot safety zone in response to determining the entry of the at least one vehicle into the robot safety zone.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
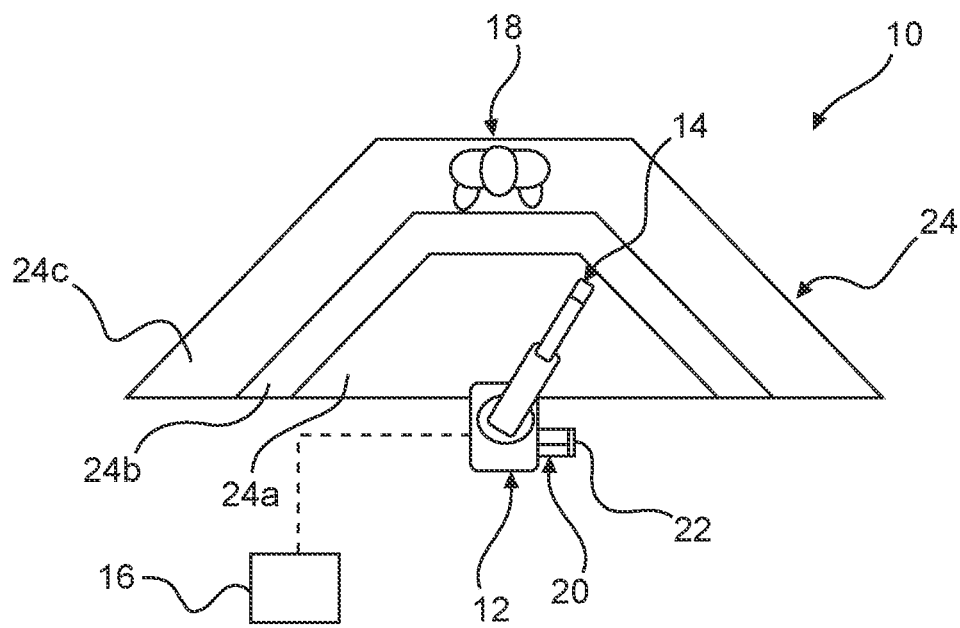
FIG. 1A shows a robot of a robotic system according to an exemplary embodiment.

In an embodiment, the present invention provides an improved robotic system and an improved method of operating such robotic system.

It should be noted that the following described aspects of the invention, including the figure description, equally apply to the robotic system, the method of operating the robotic system, to the program element, and to the computer-readable medium.

According to a first aspect, there is provided a robotic system. The robotic system comprises at least one robot, a robot controller configured to control an operation of the at least one robot, and a robot sensor system with at least one robot sensor, wherein the robot sensor system is coupled to the robot controller and configured to detect presence of an object in a robot safety zone, wherein the robot safety zone at least partially surrounds the at least one robot. The robotic system further comprises at least one automated vehicle for supplying the at least one robot, wherein the at least one vehicle comprises at least one vehicle sensor configured to detect presence of an object in a vehicle safety zone, which vehicle safety zone at least partially surrounds the at least one vehicle. Therein, the robot controller is configured to determine an entry, entering and/or a penetration of the at least one vehicle into the robot safety zone. Further, the robot controller is configured to adjust at least a part of the robot safety zone in response to determining the entry, the entering and/or the penetration of the at least one vehicle into the robot safety zone. In other words, the robot safety zone may be adjusted when and/or if the robot controller determines that the at least one vehicle intends entering and/or enters the robot safety zone, e.g. for moving within the robot safety zone.

By adjusting at least a part of the robot safety zone it can advantageously be ensured that the at least one vehicle can enter the robot safety zone and/or move within the robot safety zone, particularly without affecting and/or terminating the operation of the at least one robot. In other words, adjusting the robot safety zone may ensure that the operation of the robot is not terminated, e.g. for safety reasons and/or for avoiding a collision of the vehicle with the robot. Accordingly, a downtime of the robotic system and/or the robot can be minimized, thereby increasing an overall efficiency and performance of the robotic system.

Generally, the at least one robot may refer to an industrial robot. The robot may be configured to perform an arbitrary operation, such as e.g. assembling one or more parts, assembling a product, and/or manufacturing a part or product. For this purpose, the robot may comprise at least one movable part, such as e.g. a robot arm or the like. Therein, an operation of the robot, an operation of the movable part, a movement of the robot and/or a movement of the movable part may be at least partly controlled by the robot controller. Further, the robot may be arranged at a fixed position. In other words, the robot may be a static robot. Alternatively, however, the robot may be movable and/or translatable, e.g. along a motion track and/or along a track.

The robot controller may refer to a control unit and/or a control circuit. The robot controller may, for example, comprise one or more processors and/or processing units. Further, the robotic system and/or the robot may comprise a data storage storing a program element, a computer program and/or software instructions, which, when executed by the robot controller, instructs the robot and/or the robotic system to perform an operation, to adjust the robot safety zone and/or to perform steps of the method of operating the robotic system.

The robot sensor system may refer to a robot safety sensor system and/or a robot sensor arrangement. Further, the at least one robot sensor may refer to robot safety sensor configured to monitor and/or observe a vicinity and/or surrounding of the robot, such as the robot safety zone. Generally, the at least one robot sensor may be an arbitrary sensor or sensor element configured to detect presence of an object, such as e.g. an operator and/or a human, within the robot safety zone. The at least one robot sensor may be a range sensor, a distance sensor and/or any other type of sensor. By way of example, the at least one robot sensor may be a radar sensor, an ultrasound sensor, a laser sensor, a LIDAR sensor, an optical sensor, a camera, and/or an acoustic sensor. Preferably, the robot sensor system comprises a plurality of robot sensors allowing to comprehensively monitor and/or observe the robot safety zone.

The robot safety zone may refer to an area, a volume and/or a space around the robot, which may be monitored and/or observed by the at least one robot sensor and/or by the robot sensor system. Accordingly, the robot safety zone may be defined by a range and/or a field of view of the at least one robot sensor and/or the robot sensor system. In other words, the robot safety zone may refer and/or correspond to a detection zone of the robot sensor system and/or the at least one robot sensor. The robot safety zone may be two-dimensional or three-dimensional. Further, the robot safety zone may refer to a work area and/or work cell of the robot, in which the robot performs an operation.

The at least one automated vehicle may refer to a transport vehicle and/or a movable vehicle, e.g. for supplying and/or feeding parts, materials and/or other objects to the robot. Therein, the term automated vehicle may mean that the vehicle comprises a vehicle controller, particularly an on-board vehicle controller, configured to control a movement and/or operation of the vehicle. Therein, the vehicle controller may be independent from the robot controller. Generally, the vehicle controller may be configured to detect presence of an object in a vehicle safety zone based on processing one or more vehicle sensor signals of the at least one vehicle sensor. By way of example, the at least one vehicle can be an automated guided vehicle, which is also referred to as AGV hereinafter. Accordingly, the vehicle may be movable and/or may be configured to move within the robot safety zone. By way of example, the robotic system may comprise a robot station and/or a dock arranged at least partly within the robot safety zone, wherein the vehicle may be configured to automatically move to and/or dock to the robot station, e.g. for performing an operation within the robot safety zone.

The at least one vehicle sensor may refer to a vehicle safety sensor, e.g. an on-board vehicle sensor, configured to monitor a vicinity and/or surrounding of the vehicle, such as the vehicle safety zone. Generally, the at least one vehicle sensor may be an arbitrary sensor or sensor element configured to detect presence of an object, such as e.g. an obstacle, an operator and/or a human, within the vehicle safety zone. The at least one vehicle sensor may be a range sensor, a distance sensor and/or any other type of sensor. By way of example, the at least one vehicle sensor may be a radar sensor, an ultrasound sensor, a laser sensor, a LIDAR sensor, an optical sensor, a camera, and/or an acoustic sensor. Preferably, the vehicle comprises a plurality of vehicle sensors allowing to comprehensively monitor and/or observe the vehicle safety zone.

Analogue to the robot safety zone, the vehicle safety zone may refer to an area, a volume and/or a space around the vehicle, which may be monitored and/or observed by the at least one vehicle sensor. Accordingly, the vehicle safety zone may be defined by a range and/or a field of view of the at least one vehicle sensor. In other words, the vehicle safety zone may refer and/or correspond to a detection zone of the at least one vehicle sensor. The vehicle safety zone may be two-dimensional or three-dimensional.

In the context of present disclosure, adjusting at least a part of the robot safety zone may refer to adapting and/or modifying at least a part of the robot safety zone. Therein, the robot safety zone or at least a part thereof may be structurally, geometrically and/or functionally adjusted, modified and/or adapted by the robot controller. In other words, the robot controller may be configured to vary, modify and/or adapt at least a part of the robot safety zone if and/or when the vehicle intends entering into, enters into, intends moving within, and/or moves within the robot safety zone. By way of example, the robot controller may be configured to adjust a part and/or subzone of the robot safety zone, in which part and/or subzone the vehicle is arranged, intends to move, and/or is moving. Particularly, the robot controller may be configured to temporarily adjust the robot safety zone, e.g. while the at least one vehicle is located and/or moving at least partly within the robot safety zone.

Generally, the invention may be considered as being based on the following findings and insights. A surrounding area of industrial robots, which may be at least partly monitored by the robot sensor system, can be classified e.g. in three zones. A first zone directly adjacent to the robot may be referred to as hazard zone, wherein operation of the robot is terminated and/or a motion of the robot is stopped if an object is detected within the hazard zone. A second zone adjacent to the first zone may be referred to as potential hazard zone, wherein the robot may be instructed to stand still if an object is detected within the potential hazard zone. A third zone adjacent to the second zone may be referred to as a safe zone, wherein operation of the robot may be executed e.g. with a reduced or limited speed if an object is detected within the safe zone. It should be noted that in the context of the present disclosure one of, a plurality of or all of the first to third zones may be referred to as the robot safety zone. In conventional robotic systems, one or more of the first to third zones are static and/or fixed with respect to the robot. This also applies to robots that may be moved e.g. along a track motion, where the first to third zones are moved with the robot along the track motion and hence remain static with respect to or relative to the robot. If a vehicle, such as an AGV, enters one of the first to third zones, this entering may be detected by the robot sensor system and the corresponding pre-defined action, i.e. terminating the operation in the first zone, standing still in the second zone and operating with limited speed in the third zone, is usually performed for safety reasons. This is also referred to as a safety configuration of the robotic system. Accordingly, if a vehicle, such as e.g. an AGV, enters one or more of the first to third zones, operation of the robot may be affected and/or terminated according to one or more of the pre-defined operations, even though safe operation, e.g. at normal speed of the robot, would be possible. Accordingly, an efficiency and/or performance of the robotic system may be decreased in response to detecting the vehicle in one or more of the first to third zones and/or in the robot safety zone. Also, operation of the robot and/or the robotic system may be temporarily terminated, which can lead to an increase of a downtime of the robot and/or the robotic system.

In contrast to conventional robotic systems, the present invention allows adjusting at least a part of the robot safety zone, e.g. one or more of the first to third zones, in response to determining that the vehicle enters the robot safety zone. Accordingly, the robot safety zone according to the present invention may be regarded as a variable and/or dynamic robot safety zone. This may allow to avoid affecting and/or terminating the operation of the robot if the vehicle intends moving and/or moves within the robot safety zone, thereby increasing overall performance and efficiency of the robotic system, while maintaining a high level of safety, e.g. for operators, humans and/or personnel.

According to an embodiment, the robot controller is configured to adjust at least one of a shape and a size of the robot safety zone in response to determining the entry of the at least one vehicle into the robot safety zone. By way of example, the robot controller may be configured to reduce and/or increase a size of the robot safety zone, thereby adjusting the robot safety zone. Therein, the size of the robot safety zone may e.g. be reduced based on masking and/or blocking at least a part of the robot safety zone, which may e.g. be done by discarding detection of an object in the masked and/or blocked part of the robot safety zone. Alternatively or additionally, the robot controller may be configured to adjust a contour and/or shape of the robot safety zone. Accordingly, the robot controller may be configured to geometrically adjust the robot safety zone and/or to adjust a geometry of the robot safety zone.

According to an embodiment, the robot controller is configured to adjust the robot safety zone based on merging and/or combining at least a part and/or subzone of the robot safety zone and at least a part and/or subzone of the vehicle safety zone. Accordingly, the robot controller may be configured to generate a merged safety zone based on merging and/or combining the at least part of the robot safety zone and the at least part of the vehicle safety zone. By way of example, the at least part of the robot safety zone and the at least part of the vehicle safety zone may be merged by the robot controller based on processing, combining and/or fusing one or more robot sensor signals (and/or robot sensor data) of the at least one robot sensor and one or more vehicle sensor signals (and/or vehicle sensor data) of the at least one vehicle sensor. Generally, merging the at least part of the robot safety zone and the at least part of the vehicle safety zone may allow for a comprehensive adjustment of the robot safety zone, while maintaining a high level of safety allowing to safely operate the robotic system.

For merging the at least part of the robot safety zone and the at least part of the vehicle safety zone, one or more vehicle sensor signals of the at least one vehicle sensor may be provided to, retrieved by and/or accessed by the robot controller. For example, the robotic system may comprise a communication module allowing to transmit one or more vehicle sensor signals and/or vehicle sensor data to the robot controller. Via the communication module a unidirectional or a bidirectional communication between the vehicle and the robot controller may be established. Preferably, the communication module may be configured for wireless communication. Particularly, the communication module may be configured for safe-rated communication. However, also a tethered communication is conceivable.

According to an embodiment, the robot controller is configured to adjust the robot safety zone based on dynamically merging at least a part of the robot safety zone and at least a part of the vehicle safety zone, while at least a part of the vehicle moves within the robot safety zone. By way of example, the robot controller may be configured to process one or more vehicle sensor signals of the at least one vehicle sensor while the vehicle is moving at least partly within the robot safety zone. Accordingly, the robot controller may be configured to dynamically merge the robot safety zone with a moving safety zone (or moving vehicle safety zone), i.e. the vehicle safety zone that moves with the moving vehicle.

According to an embodiment, the robot controller is configured to adjust the robot safety zone based on substituting and/or replacing at least a part of the robot safety zone by at least a part of the vehicle safety zone. By substituting and/or replacing the at least part of the robot safety zone by the at least part of the vehicle safety zone, the at least part of the robot safety zone and the at least part of the vehicle safety zone may be merged, e.g. to generate a merged safety zone. By way of example, the at least part of the robot safety zone may be substituted by the at least part of the vehicle safety zone based on substituting and/or replacing one or more robot sensor signals by one or more vehicle sensor signals. Alternatively or additionally, detection of a presence of an object in the at least part of the robot safety zone based on the robot sensor system may be substituted and/or replaced by a detection of the object's presence in the at least part of the robot safety zone based on the at least one vehicle sensor. This may allow for a comprehensive adjustment of the robot safety zone, while maintaining a high level of safety allowing to safely operate the robotic system.

According to an embodiment, the robotic system comprises a communication module coupled to the robot controller and configured to receive a vehicle sensor signal of the at least one vehicle sensor. Therein, the communication module may refer to a communication arrangement, e.g. comprising a vehicle transmitter coupled to a vehicle controller and/or to the at least one vehicle sensor. The communication module may further comprise a receiver coupled to the robot controller, wherein the vehicle transmitter may be configured to transmit one or more vehicle sensor signals (and/or vehicle sensor data) to the receiver, such that the robot controller can process the one or more vehicle sensor signals. Alternatively or additionally, the robot controller may be configured to pull, via the communication module, one or more vehicle sensor signals from the vehicle. Preferably, the communication module is configured for a wireless communication. The communication module may, for example, comprise a WLAN module, a Bluetooth module, an RFID module, an infrared module, or any other type of communication module.

According to an embodiment, the communication module is configured to communicate with the at least one vehicle using a safety-rated (and/or safe-rated) communication protocol, such as e.g. OpenSafe, ProfiSafe, or the like. Using a safe-rated communication may ensure that data and/or sensor signals can be reliably transmitted. This may, in turn, increase a level of safety of the operation of the entire robotic system.

According to an embodiment, the robot controller is configured to detect a presence of an object in the robot safety zone and/or in the vehicle safety zone based on the vehicle sensor signal of the at least one vehicle sensor, such that at least a part (and/or a subzone) of the robot safety zone and at least a part (and/or a subzone) of the vehicle safety zone are merged. In other words, the robot controller can be configured to process one or more vehicle sensor signals in order to determine presence of the object within the robot safety zone while the vehicle is located and/or moving within the robot safety zone. Accordingly, the robot controller can be configured to use the vehicle sensor and/or the vehicle sensor signals in order to detect presence of the object in the robot safety zone.

According to an embodiment, the robot controller is configured to adjust the robot safety zone based on muting, disabling and/or deactivating at least a part (and/or a subzone) of the robot safety zone. Generally, muting the at least part of the robot safety zone may mean that the controller is configured to ignore and/or discard a detection of an object within said part of the robot safety zone, as detected based on the robot sensor system. Further, the muted part of the robot safety zone may be supplemented and/or substituted by at least a part of the vehicle safety zone, e.g. based on processing one or more vehicle sensor signals with the robot controller.

According to an embodiment, the robot controller is configured to mute the at least part of the robot safety zone based on muting, deactivating and/or disabling the at least one robot sensor of the robot sensor system. Alternatively or additionally, the robot controller is configured to mute the at least part of the robot safety zone based on discarding a robot sensor signal (and/or robot sensor data) of the at least one robot sensor of the robot sensor system.

According to an embodiment, the robot controller is configured to determine and/or detect the entry of the at least one vehicle into the robot safety zone based on processing a robot sensor signal of the robot sensor system and/or based on processing a robot sensor signal of the at least one robot sensor. This may allow the robot controller to reliably detect that the vehicle intends to enter, enters and/or penetrates into the robot safety zone.

According to an embodiment, the controller is configured to determine and/or detect the entry of the at least one vehicle into the robot safety zone based on receiving an entry signal of the vehicle, e.g. via a communication module of the robotic system. Accordingly, the vehicle may send the entry signal to the robot controller, thereby indicating that the vehicle intends to enter the robot safety zone. In response to receiving the entry signal, the robot controller may adjust the robot safety zone.

According to an embodiment, the robotic system further comprises a registration node, wherein the registration node is configured to receive a registration signal from the vehicle, thereby registering the vehicle to the robotic system. The registration signal may indicate that the vehicle intends entering the robot safety zone. Accordingly, the vehicle may be configured to transmit the registration signal to the robot controller. Therein, the registration node may refer to a dynamic node allowing a component of the robotic system, such as e.g. the vehicle, to register and/or unregister as a part or component of the robotic system. Accordingly, at least a part of or the entire registration node may be implemented in the vehicle. Alternatively or additionally, at least a part of or the entire registration node may be implemented in the robot and/or the robot controller. Using at least one registration node may ensure that only vehicles which are registered are considered and/or taken in to account by the robot controller, thereby avoiding e.g. a safety stop of the robotic system due to a vehicle that may be arranged and/or moving outside of the robot safety zone and/or the robot work area.

According to an embodiment, the registration node is configured to receive a further registration signal, thereby de-registering and/or un-registering the vehicle from the robotic system. The further registration signal may indicate that the vehicle intends to leave the robot safety zone. Accordingly, only vehicles which are registered and/or are moving at least partly within the robot safety zone may be considered and/or taken into account by the robot controller.

According to an embodiment, the robot controller is configured to receive, from the vehicle, at least one of an identification signal for identifying the vehicle and/or identifying a type of the vehicle, a position signal indicative of a position of the vehicle within the robot safety zone, and a velocity signal indicative of a velocity of the vehicle. Identifying the vehicle, determining the position and/or determining the velocity may allow to comprehensively and/or reliably adjust the robot safety zone, thereby increasing an overall level of safety or safe operation of the robotic system.

According to an embodiment, the robotic system further comprises a plurality of position sensors coupled to the robot controller and arranged along a path of the vehicle through the robot safety zone, wherein the robot controller is configured to determine, based on one or more position sensor signals of one or more of the position sensors, at least one of a position of the vehicle along the path and a velocity of the vehicle. Based on the plurality of position sensors, position data and/or velocity data, which are independent from the vehicle sensor signals and/or the robot sensor signals, can be provided. In turn, this may provide redundancy and allow for a plausibility check. In turn, a level of safety or safe operation may be increased.

According to an embodiment, the vehicle comprises at least one RFID tag, wherein each of the plurality of position sensors comprises an RFID reader configured to detect and/or read the at least one RFID tag of the vehicle, e.g. while the vehicle passes by the position sensors. Using RFID readers as position sensors may allow to precisely and reliably determine the position and/or velocity of the vehicle in a cost-efficient manner. Also, RFID readers may be advantageous in terms of their small size or compactness. Hence, RFID readers can be integrated and/or retrofit to existing robotic systems without requiring substantive modifications to the system.

According to a second aspect, there is provided a method of operating a robotic system, e.g. a robotic system as described hereinabove and in the following. The robotic system comprises at least one robot, e.g. an industrial robot, a robot controller configured to control an operation of the at least one robot, a robot sensor system with at least one robot sensor coupled to the robot controller and configured to detect presence of an object in a robot safety zone, which robot safety zone at least partially surrounds the at least one robot. The robotic system further comprises at least one automated vehicle for supplying the at least one robot, wherein the at least one vehicle comprises at least one vehicle sensor configured to detect presence of an object in a vehicle safety zone, which vehicle safety zone at least partially surrounds the at least one vehicle. Therein, the method comprises the following steps:

moving, e.g. automatically moving based on a vehicle controller of the vehicle, the at least one vehicle at least partly into the robot safety zone;

determining, with the robot controller, an entry of the at least one vehicle into the robot safety zone; and adjusting, with the robot controller, at least a part of the robot safety zone in response to determining the entry of the at least one vehicle into the robot safety zone.

It should be noted that any features, functions and elements of the robotic system, as described above and in the following, may be features, functions and/or steps of the method of operating the robotic system, as described above and in the following, and vice versa.

According to an embodiment, adjusting the robot safety zone comprises adjusting, e.g. with the robot controller, at least one of a shape and a size of the robot safety zone.

According to an embodiment, adjusting the robot safety zone comprises merging, e.g. with the robot controller, at least a part (and/or a subzone) of the robot safety zone and at least a part (and/or a subzone) of the vehicle safety zone. Therein, merging the at least part of the robot safety zone and the at least part of the vehicle safety zone may comprise creating and/or generating, e.g. by the robot controller, a merged safety zone. Further, the step of merging may comprise processing one or more robot sensor signals of the robot sensor system and/or one or more vehicle sensor signals of the vehicle sensor. Particularly, the step of merging may comprise a combined processing, combining and/or fusing, e.g. with the robot controller, one or more robot sensor signals of the robot sensor system and one or more vehicle sensor signals of the vehicle sensor.

According to an embodiment, the at least part of the robot safety zone and the at least part of the vehicle safety zone are dynamically merged, e.g. by the robot controller, while at least a part of the vehicle moves within the robot safety zone.

According to an embodiment, adjusting the robot safety zone comprises substituting at least a part of the robot safety zone by at least a part of the vehicle safety zone, thereby merging the at least part of the robot safety zone with the at least part of the vehicle safety zone. Therein, the at least part of the robot safety zone may be substituted by the at least part of the vehicle safety zone based on discarding a detection of a presence of an object in the at least part of the robot safety zone based on one or more robot sensor signals, and based on detecting presence of the object in the at least part of the robot safety zone based on, e.g. solely based on, one or more vehicle sensor signals of the at least one vehicle sensor.

According to an embodiment, substituting the at least part of the robot safety zone by the at least part of the vehicle safety zone comprises using and/or processing, with the robot controller, one or more vehicle sensor signals (and/or vehicle sensor data) of the at least one vehicle sensor for detecting presence of an object in the vehicle safety zone and/or in the robot safety zone, e.g. while the at least one vehicle is moving at least partly within the robot safety zone. Accordingly, the one or more vehicle sensor signals may be processed and/or used by the robot controller, thereby supplementing the robot sensor system and/or substituting one or more robot sensor signals acquired by the robot sensor system.

According to an embodiment, adjusting the robot safety zone comprises transmitting, preferably via a wireless communication and/or via a wireless communication module of the robotic system, one or more vehicle sensor signals (and/or vehicle sensor data) of the at least one vehicle sensor to the robot controller. Further, the method comprises processing, with the robot controller, the one or more vehicle sensor signals, e.g. to detect presence of an object in the robot safety zone and/or in the vehicle safety zone.

According to an embodiment, adjusting the robot safety zone comprises generating, by the robot controller, a moving vehicle safety zone (also referred to as moving safety zone) based on one or more vehicle sensor signals (and/or vehicle sensor data) of the at least one vehicle sensor and/or based on the vehicle safety zone, while the at least one vehicle moves within the robot safety zone. The method further comprises supplementing, by the robot controller, the robot safety zone with the moving safety zone. Accordingly, at least a part and/or at least a subzone of the robot safety zone may be supplemented, substituted and/or replaced by the moving safety zone, wherein the moving safety zone may refer to the vehicle safety zone while the vehicle is moving within the robot safety zone. The moving safety zone may refer to the vehicle safety zone which moves with the moving vehicle. As the robot can be configured to operate safely within the moving safety zone, an operator and/or human may be allowed to work next to the vehicle without affecting the operation of the robot, e.g. without causing the robot and/or the robotic system to go into an emergency stop.

According to an embodiment, adjusting the robot safety zone comprises disabling and/or muting, with the robot controller, at least a part of the robot safety zone. By way of example, the at least part of the robot safety zone can be disabled while the at least one vehicle is at least partly positioned within said at least part of the robot safety zone. Alternatively or additionally, the at least part of the robot safety zone can be disabled while the at least one vehicle is at least partly moving within said at least part of the robot safety zone.

According to an embodiment, disabling and/or muting the at least part of the robot safety zone comprises disabling the at least one robot sensor of the robot sensor system. Alternatively or additionally, disabling and/or muting the at least part of the robot safety zone comprises discarding one or more robot sensor signals (and/or one or more robot sensor data) of the at least one robot sensor of the robot sensor system. Alternatively or additionally, disabling and/or muting the at least part of the robot safety zone comprises discarding detection of a presence of an object in the at least part of the robot safety, as detected based on one or more robot sensor signals of the robot sensor system.

According to an embodiment, the method further comprises determining the entry of the at least one vehicle into the robot safety zone based on processing, with the robot controller, a robot sensor signal of the robot sensor system. Alternatively or additionally, the method comprises determining the entry of the at least one vehicle into the robot safety zone based on processing, with the robot controller, an entry signal of the vehicle, preferably wherein the entry signal is transmitted from the at least one vehicle to the robot controller via a wireless communication and/or a wireless communication module.

According to an embodiment, the method further comprises moving the at least one vehicle at least partly out of the robot safety zone, and determining, with the robot controller, that the at least one vehicle is at least partly moving out of the robot safety zone. This may ensure that the robot controller is aware that the vehicle has left or is leaving the robot safety zone, e.g. such that the vehicle's safety system and/or the vehicle sensor can be discarded by the robot controller.

According to an embodiment, the method further comprises registering, with a registration node of the robotic system, the at least one vehicle, thereby indicating that the at least one vehicle intends entering the robot safety zone. By means of the registration node it may be ensured that the robot controller only takes those vehicles into account which are registered via the registration node to the robotic system. Hence, operation of the robotic system may not be affected by an unregistered vehicle.

According to an embodiment, the method further comprises determining presence of an object in the adjusted robot safety zone (i.e. the robot safety zone adjusted by the robot controller), and terminating, slowing-down and/or limiting an operation of the at least one robot in response to determining presence of the object in the adjusted robot safety zone. Therein, presence of the object may be detected by the robot controller based on one of or both a robot sensor signal of the robot sensor system and a vehicle sensor signal of the vehicle sensor.

According to an embodiment, the method further comprises determining, with the robot controller, at least one of a position of the at least one vehicle within the robot safety zone, and a velocity of the at least one vehicle. Alternatively or additionally, the method comprises tracking, with the robot controller, the at least one vehicle and/or a movement of the at least one vehicle, while the at least one vehicle is positioned and/or moving within the robot safety zone. This allows to dynamically adjust the robot safety zone based on the vehicle safety zone.

According to a third aspect, there is provided a program element and/or a computer program, which, when executed by a robotic system, by a robot controller of the robotic system and/or by a processor of the robot controller, instructs the robotic system to perform the method, as described above and in the following.

According to a fourth aspect, there is provided a non-transitory computer-readable medium storing a program element, which, when executed by a robotic system, by a robot controller of the robotic system and/or by a processor of the robot controller, instructs the robotic system to perform the method, as described above and in the following.

It should be noted that features, functions, elements and/or steps, which are described above and in the following with reference to one aspect of the invention, equally apply to any other aspect of the invention described above and in the following. Particularly, features and/or elements, as described above and in the following with reference to the robotic system according to the first aspect, equally apply the method according to the second aspect, to the program element according to the third aspect, and to the computer-readable medium according to the fourth aspect, and vice versa.

These and other aspects of the invention will be apparent from and elucidated with reference to the embodiments described hereinafter.

The figures are schematic only and not true to scale. In principle, identical or like parts, elements and/or steps are provided with identical or like reference symbols in the figures.

Figure 1B:
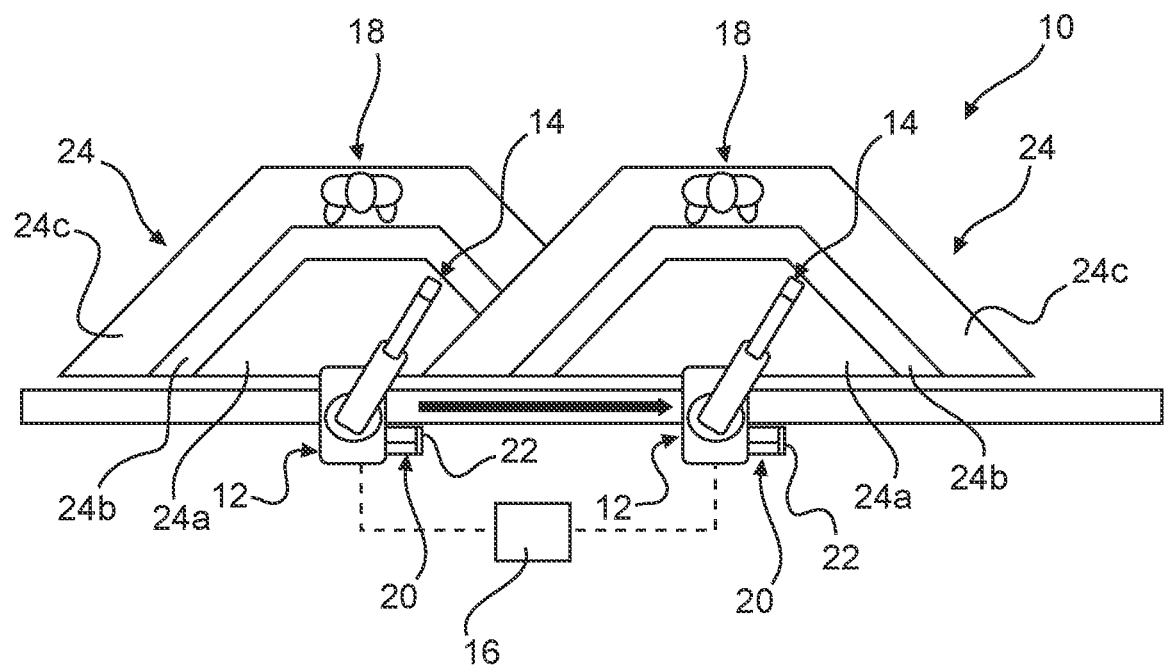
FIG. 1B shows a further robot of a robotic system according to an exemplary embodiment.

FIGS. 1A and 1B each show an exemplary robot 10 of a robotic system 100 (see FIGS. 3 to 7).

The robot 10 comprises a robot body 12 and a movable robot arm 14 attached thereto. The robot 10 further comprises a robot controller 16 configured to control an operation of the robot 10, an operation of the robot arm 14, a movement of the robot 10 and/or a movement of the robot arm 14.

The robot 10 further comprises a robot sensor system 20 with at least one robot sensor 22. The robot sensor system 20 and/or the at least one robot sensor 22 is configured to detect presence of an object 18 in a robot safety zone 24, which at least partly surrounds the robot 10. In the example depicted in FIGS. 1A and 1B, respectively, the object 18 is an operator 18 and/or a human 18.

By way of example, the at least one robot sensor 22 may be a range sensor, a distance sensor and/or any other type of sensor. For instance, the at least one robot sensor 22 may be a radar sensor, an ultrasound sensor, a laser sensor, a LIDAR sensor, an optical sensor, a camera, and/or an acoustic sensor. Preferably, the robot sensor system 20 comprises a plurality of robot sensors 22 allowing to comprehensively monitor and/or observe the robot safety zone 24.

Generally, the robot safety zone 24 may refer to an area, a volume and/or a space around the robot, which may be monitored and/or observed by the at least one robot sensor 22 and/or by the robot sensor system 20. Accordingly, the robot safety zone 24 may be defined by a range and/or a field of view of the at least one robot sensor 22 and/or the robot sensor system 20. In other words, the robot safety zone 24 may refer and/or correspond to a detection zone 24 of the robot sensor system 20 and/or the at least one robot sensor 22. The robot safety zone 24 may be two-dimensional or three-dimensional. Further, the robot safety zone 24 may refer to a work area 24 and/or work cell 24 of the robot, in which the robot 10 performs an operation. By way of example the safety zone 24 may refer to a cartesian safety zone 24, i.e. a safety zone 24 given in cartesian coordinates.

The robot 10 and/or the robot controller 16 may be configured for supervising and/or controlling a position of the robot arm 14 and/or of a tool, which may e.g. be mounted to the robot arm 14. Further, the robot 10 and/or the robot controller 16 may be configured for supervising and/or controlling a speed of the robot arm 14 (and/or of a tool attached thereto). Such supervision of the position and/or the speed may, alternatively or additionally, be supervised by an external system, e.g. an external controller.

As shown in FIG. 1B, the robot 10 may be movable along a track, a track motion and/or an axis, as indicated by the arrow in FIG. 1B. The robot controller 16 and/or an external controller may be configured to control and/or supervise a position and/or a speed of the robot 10 along the track and/or axis. Accordingly, a movement along the track and/or axis may be controlled by the robot controller 16, wherein the safety zone 24 of the robot 10, e.g. mounted on the track or a track motion, can be defined relative to a coordinate system moving with the robot 10.

In the example depicted in FIGS. 1A and 1B, the robot safety zone 24 comprises three safety subzones and/or three zones 24a, 24b, 24c. The first zone 24a may be referred to as hazard zone. If the robot sensor system 20 and/or the robot controller 16 detects an object 18 within the first zone 24a, any motion and/or operation of the robot 10 is terminated and/or stopped by the robot controller 16 in reaction and/or in response to detecting the object 18. Therein, the first zone 24a directly adjoins and/or surrounds at least a part of the robot 10. Further away from the robot 10 as the first zone 24a, the second zone 24b is arranged and/or located, which adjoins the first zone 24a and which may be referred to as potential hazard zone. If the robot sensor system 20 and/or the robot controller 16 detects an object 18 within the second zone 24b, the robot controller 16 may instruct the robot 10 to stand still in reaction and/or in response to the detection of the object 18. Even further away from the robot 10 as the second zone 24b, the third zone 24c is arranged and/or located, which adjoins the second zone 24b and which may be referred to as safe zone. If the robot sensor system 20 and/or the robot controller 16 detects an object 18 within the third zone 24c, the robot controller 16 may instruct the robot 10 to execute the operation with a limited speed in reaction and/or in response to the detection of the object 18. It should be noted that in the context of the present disclosure, the robot safety zone 24 may refer to one of, to more of, or all of the three zones 24a-c. Generally, the robot safety zone 24 and/or the three zones 24a-c as well as the corresponding reactions of the robot 10 in response to detecting the object 18 may be referred to as a safety configuration of the robot 10.

FIGS. 2A to 2D each show an exemplary automated vehicle 30 of a robotic system 100 (see FIGS. 3 to 7).

The automated vehicle 30 may be a transport vehicle 30. The vehicle 30 may be configured to feed and/or supply the robot 10, e.g. with parts, products and/or materials. Accordingly, the vehicle 30 may be configured to move, e.g. in an automated manner. Further, the vehicle 30 may be an automated guided vehicle (also referred to as AGV) for feeding and/for supplying the robot 10 and/or the robotic system 100.

The vehicle 30 comprises one or more on-board vehicle sensor 32. Further, the vehicle 30 comprises an on-board vehicle controller 34 configured to control a movement and/or operation of the vehicle 30. Further, the vehicle controller 34 may be configured to process one or more vehicle sensor signals of the one or more vehicle sensors 32.

Generally, the at least one vehicle sensor 32 may be an arbitrary sensor or sensor element configured to detect presence of an object 18, such as e.g. an obstacle, an operator and/or a human, within a vehicle safety zone 36. The at least one vehicle sensor 32 may be a range sensor, a distance sensor and/or any other type of sensor. By way of example, the at least one vehicle sensor 32 may be a radar sensor, an ultrasound sensor, a laser sensor, a LIDAR sensor, an optical sensor, a camera, and/or an acoustic sensor. Preferably, the vehicle 30 comprises a plurality of vehicle sensors 32 allowing to comprehensively monitor and/or observe the vehicle safety zone 36.

Analogue to the robot safety zone 24, the vehicle safety zone 36 may refer to an area, a volume and/or a space around the vehicle 30, which may be monitored and/or observed by the at least one vehicle sensor 32. Accordingly, the vehicle safety zone 36 may be defined by a range and/or a field of view of the at least one vehicle sensor 32. In other words, the vehicle safety zone 36 may refer and/or correspond to a detection zone of the at least one vehicle sensor 32.

Figure 2A:
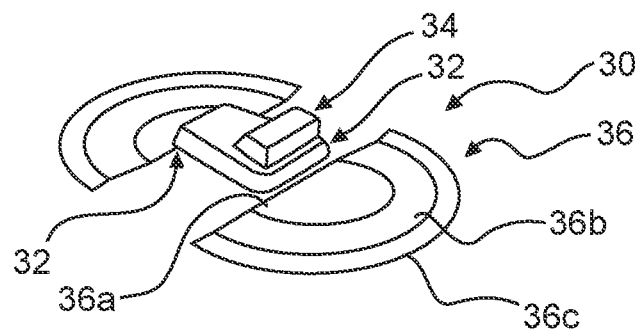
FIGS. 2A to 2D each show an automated vehicle of a robotic system according to an exemplary embodiment.

In the example depicted in FIG. 2A, the vehicle 30 comprises two vehicle sensors 32, wherein one senor 32 is configured to monitor a front side or area of the vehicle 30 and the other sensor 32 is configured to monitor a rear side or area of the vehicle 30.

Figure 2B:
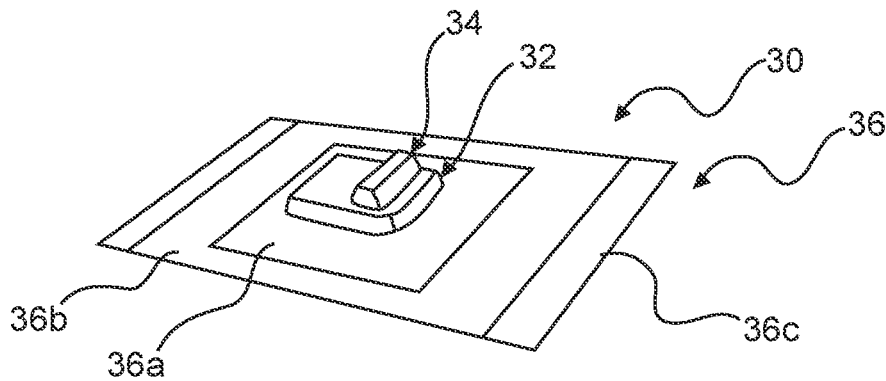

In the example depicted in FIG. 2B, the vehicle 30 comprises one or more vehicle sensors 32 for monitoring the vehicle safety zone 36, which entirely surrounds the vehicle 30.

Figure 2C:
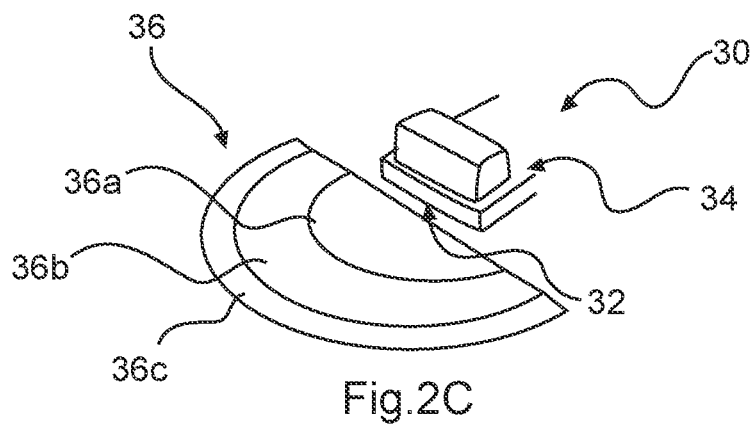

In the example depicted in FIG. 2C, the vehicle 30 comprises one vehicle sensor 32 for monitoring a front side or area of the vehicle 30.

Figure 2D:
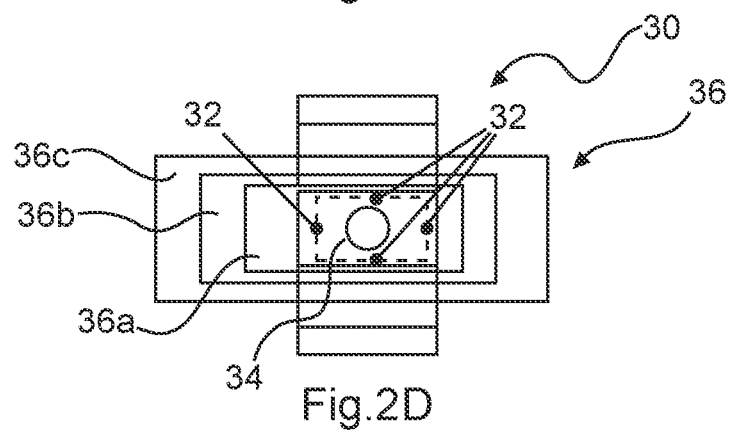

Further, in the example depicted in FIG. 2D, the vehicle 30 comprises four vehicle sensors 32, wherein on each side of the vehicle 30 one of the vehicle sensors 32 is arranged, such that the entire surrounding of the vehicle 30 can be monitored by means of the four vehicle sensors 32.

Analogue to the robot safety zone 24 of FIGS. 1A and 1B, the vehicle safety zones 36 depicted in each of the examples of FIGS. 2A to 2D, each vehicle safety zone 36 comprises three safety subzones and/or three zones 36a, 36b, 36c. The first zone 36a may be referred to as protection zone or safe zone. If the vehicle sensor 32 and/or the vehicle controller 34 (e.g. based on processing one or more vehicle sensor signals) detects an object 18 within the first zone 36a, any motion and/or operation of the vehicle 30 is terminated and/or stopped by the vehicle controller 34 in reaction and/or in response to detecting the object 18. Therein, the first zone 36a directly adjoins and/or surrounds at least a part of the vehicle 30. Further away from the vehicle 30 as the first zone 36a, the second zone 36b is arranged and/or located, which adjoins the first zone 36a and which may be referred to as warning zone one (warning zone 1). If the vehicle sensor 32 and/or the vehicle controller 34 detects an object 18 within the second zone 36b, the vehicle controller 34 may instruct the vehicle 30 to stand still in reaction and/or in response to the detection of the object 18. Even further away from the vehicle 30 as the second zone 36b, the third zone 36c is arranged and/or located, which adjoins the second zone 36b and which may be referred to warning zone two (warning zone 2). If the vehicle sensor 32 and/or the vehicle controller 34 detects an object 18 within the third zone 36c, the vehicle controller 34 may instruct the vehicle 30 to reduce a speed or velocity of the vehicle 30.

Figure 3:
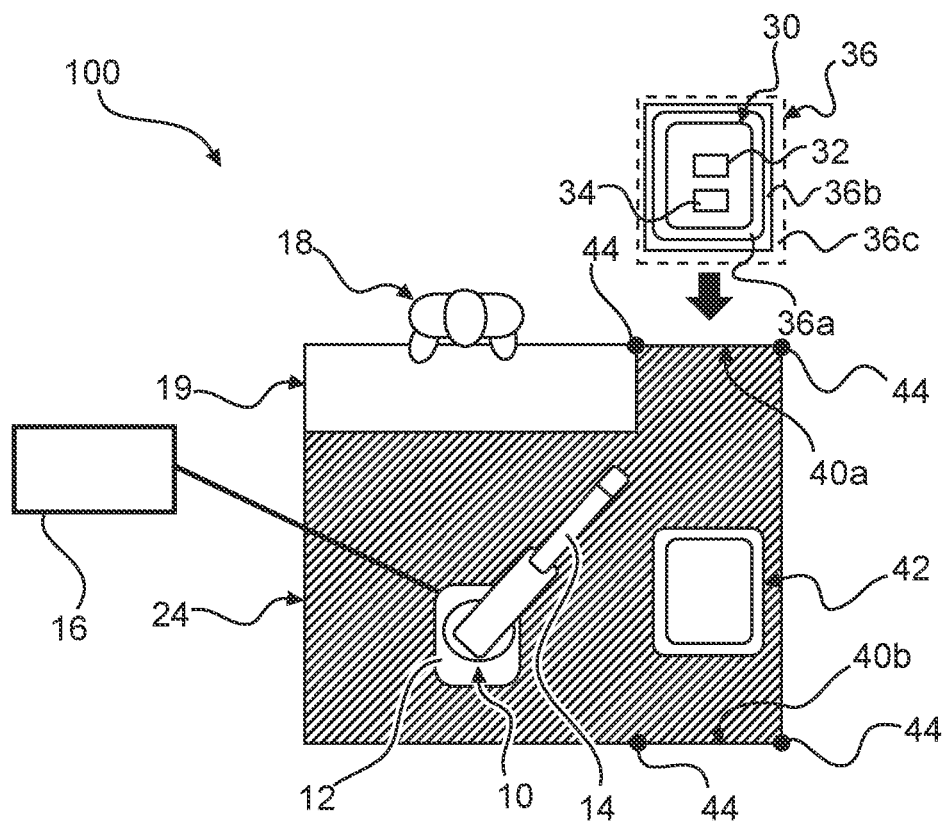
FIG. 3 shows a robotic system according to an exemplary embodiment.

FIG. 3 shows a robotic system 100 according to an exemplary embodiment.

The robotic system 100 comprises a robot 10. If not stated otherwise, the robot 10 comprises the same features and/or elements as the robot 10 described with reference to FIGS. 1A and 1B. Specifically, the robot 10 and/or the robotic system 100 comprises a robot sensor system 20 with at least one robot sensor 22 monitoring and/or observing the robot safety zone 24. Further, the robot 10 and/or the robotic system 100 comprise a robot controller 16 controlling operation of the robot 10.

The robotic system 100 further comprises a vehicle 30. If not stated otherwise, the vehicle 30 comprises the same features and/or elements as the vehicle 30 described with reference to FIGS. 2A to 2D. Specifically, the vehicle 30 comprises at least one vehicle sensor 32 monitoring and/or observing the vehicle safety zone 36. Further, the vehicle 30 comprises a vehicle controller 34 controlling operation and/or movement of the vehicle 30.

An operator 18 may be located in a collaboration zone 19 observing operation of the robotic system 100.

For supplying the robot 10, the vehicle 30 may enter the robot safety zone 24 via a gate 40a and e.g. dock to a robot station 42. After supplying the robot 10, the vehicle may leave the robot safety zone via a further gate 40b. The gates 40a, 40b may be secured by safety sensors 44, which are configured so that the vehicle 30 can pass through, but humans 18 would be recognized, e.g. by the difference in the silhouette and size. Frequently, however, the robot controller 16 may detect the vehicle 30 in the robot safety zone 24 and terminate, limit and/or slow-down the operation of the robot 10.

Figure 4:
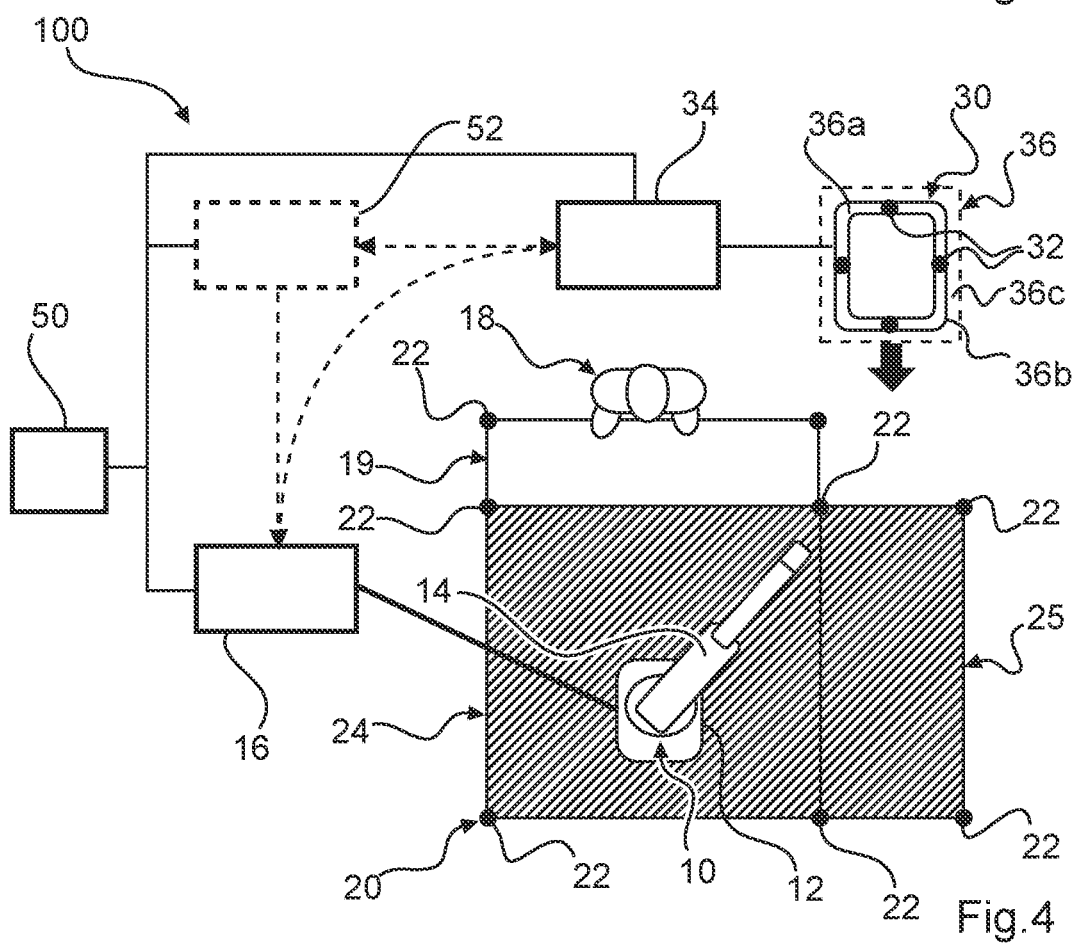
FIG. 4 shows a robotic system according to an exemplary embodiment.

FIG. 4 shows a robotic system 100 according to an exemplary embodiment. If not stated otherwise, the robotic system 100 of FIG. 4 comprises the same elements and/or features as the robotic system 100 described with reference to FIG. 3.

As described with reference to FIG. 3, the robotic system 100 comprises a robot 10, a robot sensor system 20 with robot sensors 22, and a robot controller 16 for processing robot sensor signals of the robot sensor system 20. The robot sensors 22 may refer to safety sensors 22 for monitoring the robot safety zone 24 and/or the collaboration zone 19.

Optionally, the robot sensors 22 can be connected to an external safety controller, which communicates with the robot controller 16.

The robotic system 100 further comprises one or more vehicles 30, e.g. AGVs 30, each with on-board vehicle sensor(s) 32 and on-board vehicle controller 34 e.g. for safety control.

The vehicle 30 and the robot controller 16 communicate via a communication module 50, preferably via safe-rated (or safety-rated) communication and/or using a safe-rated communication protocol. However, the communication may be based on a standard (not safety-rated) wireless communication. The robot controller 16 may retrieve, access and/or receive vehicle sensor signals and/or vehicle sensor data of the vehicle sensors 32, allowing the robot controller 16 to derive and/or determine the vehicle safety zone 36.

Optionally, the communication between the robot controller 16 and the vehicle 30 can be routed via a traffic control management system 52.

The robot controller 16 is configured to determine, e.g. based on one or more robot sensor signals and/or robot sensor data of the robot sensor system 20 and/or based on one or more vehicle sensor signals of the vehicle sensors 32 an entry (and/or intention to enter) of the vehicle 30 into the robot safety zone 24. Alternatively or additionally, the vehicle 30 may send an entry signal to the robot controller 16.

The robot controller 16 is further configured to adjust at least a part of the robot safety zone 24, e.g. geometrically, functionally and/or structurally, in response to determining entry of the vehicle 30 into the robot safety zone 24. This ensures safe robot operation of the robotic system 100 while the vehicle 30 may move within the robot work area 24 and/or the robot safety zone 24.

For adjusting at least a part of the robot safety zone 24, the robot controller 16 may merge, e.g. dynamically merge, at least a part of the robot safety zone 24, e.g. part 25 in FIG. 4, and at least a part of the vehicle safety zone 36. For instance, the robot controller 16 may be configured to partially mute one or more of the robot sensors 22. Further, the vehicle sensor signals of the vehicle sensors 32 may be used by the robot controller 16 as additional safety sensing mechanism for the (e.g. stationary) robot 10 to detect presence of e.g. a human 18 or obstacles around the vehicle 30 and/or within the robot safety zone 24. For example, safe-rated communication via the communication module 50 may be used to provide one or more vehicle sensor signals of the vehicle sensors 32 to the robot controller 16. Further, the effective work area 24 and/or robot safety zone 24 of the robot 10 can also be moved according to the motion of the vehicle 30.

Accordingly, the robot controller 16 may be configured to merge the safety zones 24, 36 of robot 10 and vehicle 30 at least partially, e.g. based on partially muting one or more robot sensors 22 and/or a part of the robot safety zone 24. For instance, one or more robot sensor signals may be discarded by the robot controller 16. Further, the robot controller 16 may use the vehicle sensors 32 and/or the vehicle safety zone 36, e.g. to compensate for partially muting the robot safety zone 24. Also, the vehicle sensors 32 may be used by the robot controller 16 for supplementing, substituting and/or replacing at least a part of the robot safety zone 24 based on the vehicle safety zone 36, e.g. generating a moving safety zone 36 moving with the vehicle 30 within the robot safety zone 24.

Further details of the robotic system 100 of FIG. 4 will be described hereinafter. FIGS. 5A to 5D show a robotic system 100 according to an exemplary embodiment. If not stated otherwise, the robotic system 100 of FIGS. 5A to 5D comprises the same elements and/or features as the robotic system 100 described with reference to FIGS. 3 and 4. For reasons of clarity, some reference numerals are not shown in FIGS. 5A to 5D.

The safety configuration and/or the robot controller 16 of the robotic system 100 is configured to adjust at least a part of the robot safety zone 24 e.g. based on partially muting one or more of the robot sensors 22 during robot operation.

Figure 5A:
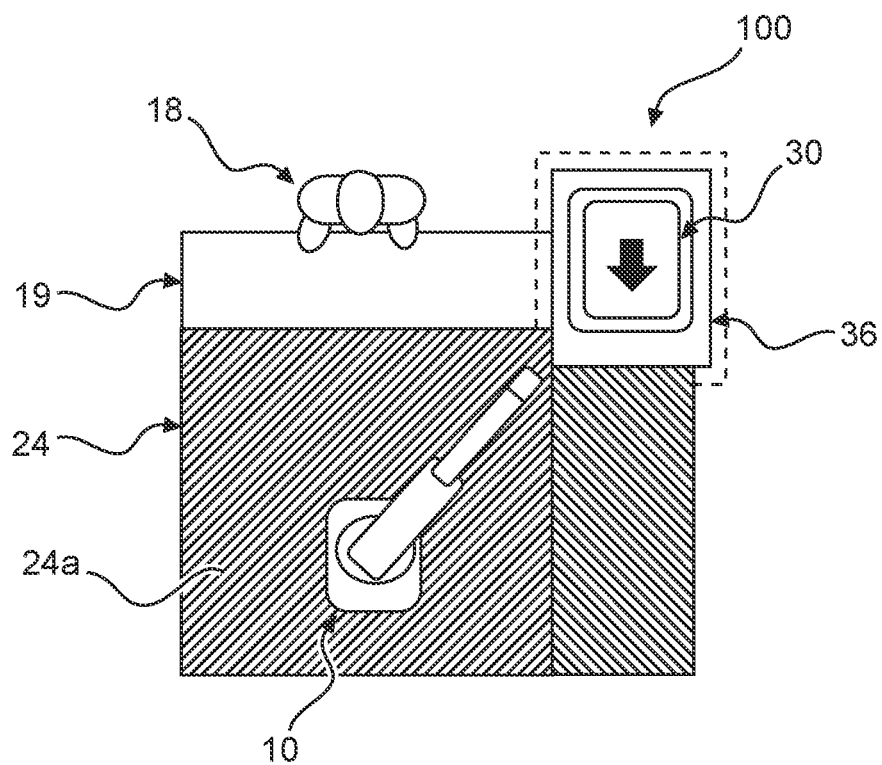
FIGS. 5A to 5D show a robotic system according to an exemplary embodiment.

FIG. 5A depicts a vehicle 30 entering the robot safety zone 24 after the robot controller 16 determined that the vehicle 30 intends to enter the robot safety zone 24. When vehicle 30 is entering the work area 24 or robot safety zone 24, e.g. the first zone 24a, it can be detected by the robot sensor system 20 and/or the robot controller 16. Alternatively or additionally, an entering signal (and/or entry signal), e.g. a safety rated signal, may be received from the vehicle 30 by the robot controller 16, which tells the robot controller 16 that the vehicle 30 is intending to enter the work area 24 and/or robot safety zone 24.

The robot controller 16 may then mute the robot safety zone 24 at least partially, e.g. an entering area of the robot safety zone 24 may be muted, thereby allowing the vehicle 30 to enter the robot safety zone 24.

Figure 5B:
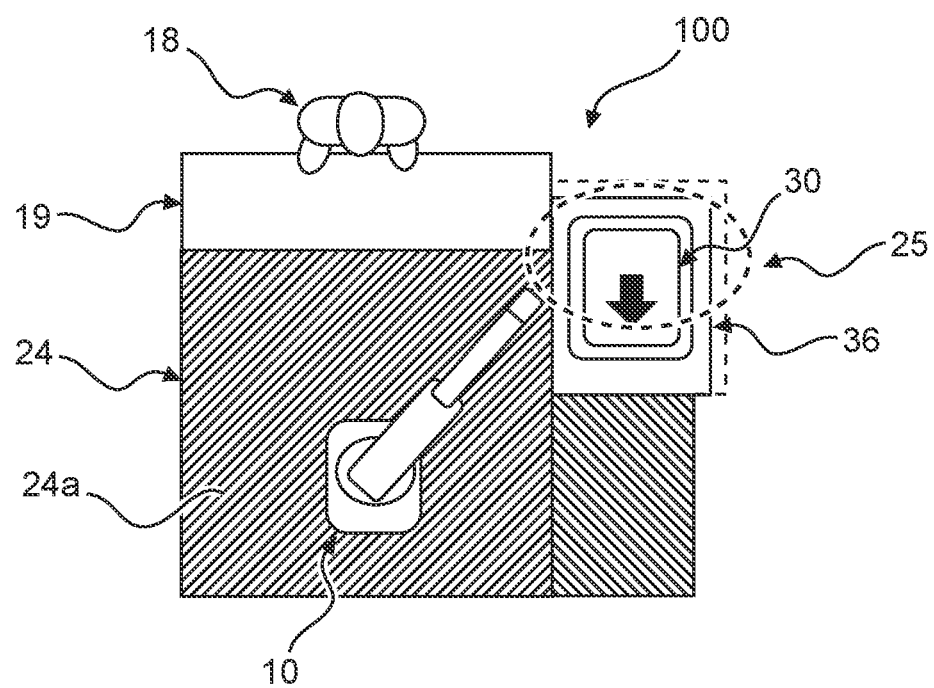

Further, the robot controller 16 may merge, e.g. temporarily merge, at least a part of the robot safety zone 24 and the vehicle safety zone 36, e.g. via safety rated communication of corresponding safety signals and/or vehicle sensor signals, as shown in FIG. 5B. Accordingly, the robot controller 16 may supplement the robot sensor system 20 with the vehicle sensors 32, e.g. to create a merged safety zone 25.

Figure 5C:
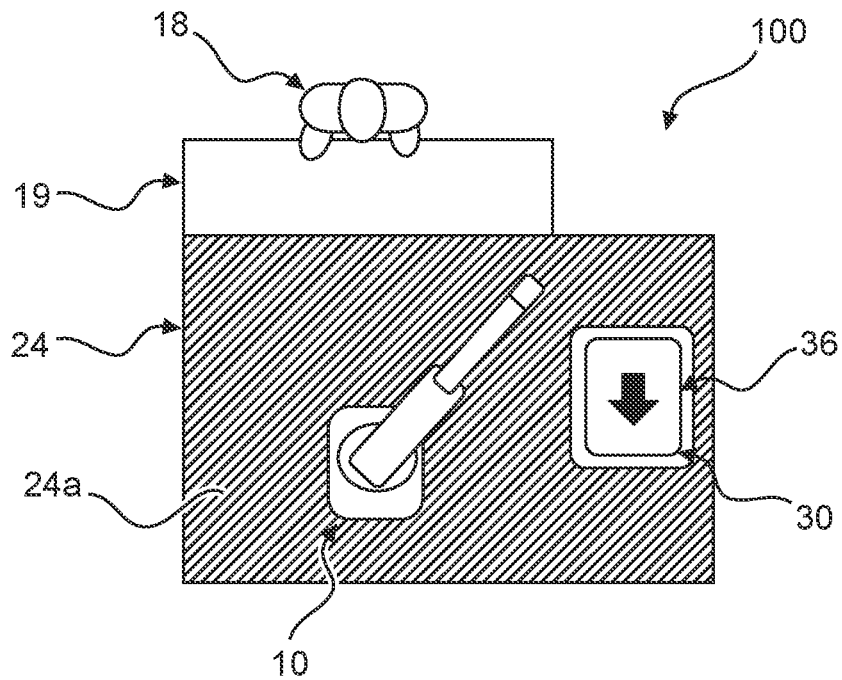

FIG. 5C shows the vehicle 30 being completely within the robot safety zone 24. For example, the robot controller 16 may be configured to use the robot sensor system 20 to monitor the entire robot safety zone 24 and/or the robot controller 16 may mute the vehicle sensors 32.

Figure 5D:
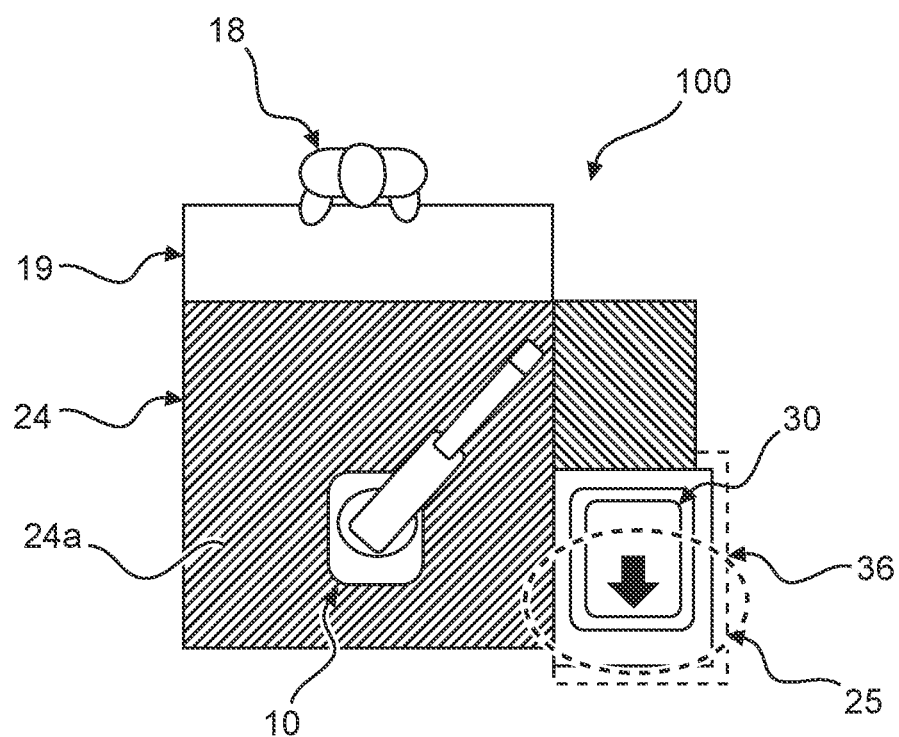

FIG. 5D shows the vehicle 30 leaving the robot work area 24 and/or robot safety zone 24. The robot con trailer 16 may at least partially merge the safety zones 24, 36 of the robot 10 and the vehicle 30, e.g. temporarily, as described with reference to FIG. 5A.

Figure 6:
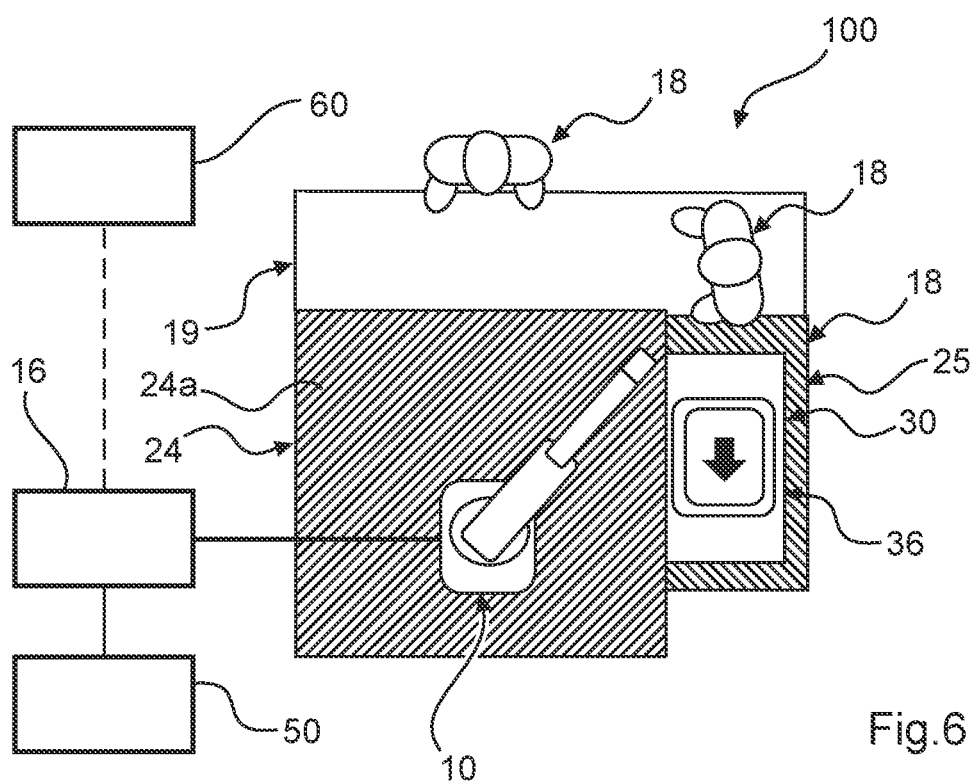
FIG. 6 shows a robotic system according to an exemplary embodiment.

FIG. 6 shows a robotic system 100 according to an exemplary embodiment. If not stated otherwise, the robotic system 100 of FIG. 6 comprises the same elements and/or features as the robotic system 100 described with reference to FIGS. 3 to 5D. For reasons of clarity, some reference numerals are not shown in FIG. 6.

In the example shown in FIG. 6, the robot safety zone 24 is adjusted by the robot controller 16 based on substituting at least a part 25 and/or subzone 25 of the robot safety zone 24 by at least a part and/or subzone of the vehicle safety zone 36 as observed by the vehicle sensors 32. The subzone 25 may be larger than the original vehicles safety zone 36 to provide more space to the robot 10, e.g. to stop.

The robot controller 16 may be configured to determine and/or generate a moving subzone 25 (also referred to as moving safety zone 25) that is moving with the vehicle 30 while the vehicle 30 is moving within the robot safety zone 24. As the robot 10 can be configured to operate safely within the subzone 25, it enables human workers 18 to work next to the vehicle 30, when necessary, e.g. without causing the robot 10 going into an emergency stop.

Further, the robot controller 16 may be configured to limit a motion of the robot 10 and/or the robot arm 14 within the moving subzone 25 and/or the moving safety zone 25.

Both for merging of robot's and vehicle's safety zones 24, 36, e.g. as described with reference to FIGS. 5A to 5D, and for using the vehicle's safety system to maintain a moving subzone 25 and/or moving safety zone 25, as described e.g. with reference to FIG. 6, a safe mechanism for identification and localization of the vehicle 30 as well as for obtaining a safety signal for the violation of the subzone 25 by humans 18 may be desirable.

For this purpose, safety rated communication may be used by means of the communication module 50 of the robotic system 100. An identification and/or localization of the vehicle 30 and/or a safety signal may be sent by the vehicle 30 to the robot controller 16 via safety rated wireless communication, e.g. based on the ProfiSafe protocol. The safety rated communication between the robot controller 16 and all participating vehicles 30 may be established at start-up of the robotic system 100 and corresponding safety configuration, wherein all the variations of zones can be verified and used for the operation. Preferably, the safety configuration contains all possible variations, thus also include all participants (especially the vehicles 30).

Optionally, the robotic system 100 may comprise and/or the robot controller 16 may be configured to provide one or more registration nodes 60, e.g. dynamic nodes 60, allowing to register and/or unregister the vehicles 30 to the robotic system 100 and/or with the safety system thereof. Accordingly, the vehicles 30 can register themselves as part of the safety system and/or the robotic system 100, when they intend to enter the work area 24 and/or the robot safety zone 24. Further, the vehicles 30 can un-register themselves from the safety system of the robot station and/or from the robotic system 100, when they leave the work area 24 and/or the robot safety zone 24.

This allows avoiding a failure or interrupt of communication with one the participants to cause a safety stop of the whole system 100, such as e.g. a failure of just one vehicle 300 outside the robot work area 24. Also, the vehicles 30 do not necessarily have to be within the reachability of the safe wireless communication in such a configuration or embodiment of the robotic system 100.

Figure 7:
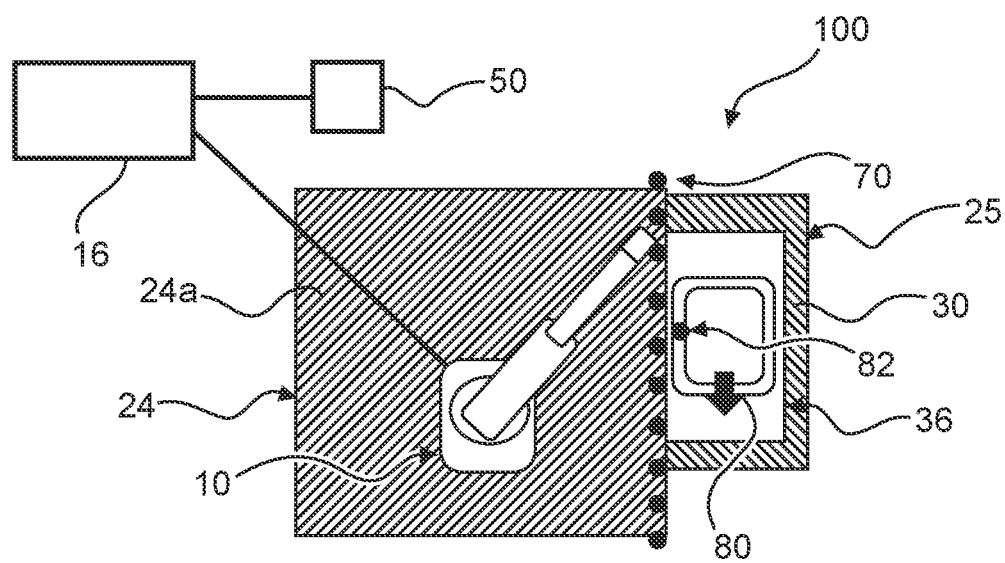
FIG. 7 shows a robotic system according to an exemplary embodiment.

FIG. 7 shows a robotic system 100 according to an exemplary embodiment. If not stated otherwise, the robotic system 100 of FIG. 7 comprises the same elements and/or features as the robotic system 100 described with reference to FIGS. 3 to 6. For reasons of clarity, some reference numerals are not shown in FIG. 7.

In the embodiment of FIG. 7, a dual channel safety architecture is implemented in the robotic system 100.

Therein, the communication module 50 and/or the robot controller 16 may use a standard, non-safety communication with the vehicle 30.

Further, the robotic system 100 comprises a plurality of position sensors 70 arranged along a track 80 and/or path 80 of the vehicle 30 through the robot safety zone 24. The position sensors 70 may provide redundant information.

By way of example, an identification signal, a position signal, a velocity signal and/or a safety status signal can be sent to the robot controller 16 via standard wireless communication using the communication module 50. The vehicle 30 can be equipped with at least one RFID tag 82 and the position sensors 70 may be RFID readers 70 installed along the path 80 of the vehicle 30, e.g. in a row. The identification, position and/or velocity of the vehicle 30 along the path 80 can be determined and/or obtained by the robot controller 16 e.g. through fusion of the data captured and/or acquired by the RFID readers 70 (e.g. a phase-based method can achieve millimeter accuracy). The velocity of the vehicle 30 may thereby indicate a safety status of the vehicle 30, e.g. s safety stop, which can be determined by the robot controller 16. Data and/or signals obtained via wireless communication from the vehicle 30 and those obtained from the RFID readers 70 can together form and/or build a set of dual-channel safety data for the robot safety control and/or the robotic system 100.

In the example of FIG. 7, the RFID readers 70 may work like a virtual encoder for determining a position and/or a velocity of the vehicle 30. It should be noted, however, that also other types of position sensors 70 may be used instead of or in addition to the RFID technique exemplarily described hereinabove.

Figure 8:
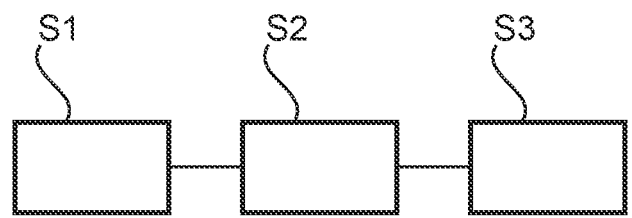
FIG. 8 shows a flowchart illustrating steps of a method of operating a robotic system according to an exemplary embodiment.

FIG. 8 shows a flowchart illustrating steps of a method of operating a robotic system 100 according to an exemplary embodiment. The robotic system 100 may correspond and/or refer to a robotic system 100 as described with reference to previous figures.

Step S1 comprises moving, e.g. automatically moving, the at least one vehicle 30 at least partly into the robot safety zone 24, e.g. based on the vehicle controller 34.

Step S2 comprises determining and/or detecting, with the robot controller 16, an entry of the at least one vehicle 30 into the robot safety zone 24.

Further, step S3 comprises adjusting, with the robot controller 16, at least a part of the robot safety zone 24 in response to determining the entry of the at least one vehicle 30 into the robot safety zone 24.

In step S3 at least one of a shape and a size of the robot safety zone 24 may be adjusted, for example.

Optionally, adjusting the robot safety zone 24 in step S3 may comprise merging at least a part of the robot safety zone 24 and at least a part of the vehicle safety zone 36.

Further, step S3 may optionally comprise substituting at least a part of the robot safety zone 24 by at least a part of the vehicle safety zone 36, thereby merging the at least part of the robot safety zone 24 with the at least part of the vehicle safety zone 36. For example, substituting the at least part of the robot safety zone 24 by the at least part of the vehicle safety zone 36 may comprise using and/or processing, with the robot controller 16, a vehicle sensor signal of the at least one vehicle sensor 32 for detecting presence of an object 18 in the vehicle safety zone 36 and/or in the robot safety zone 24, e.g. while the vehicle 30 is located at least partly in the robot safety zone 24.

Moreover, step S3 may optionally comprise transmitting, preferably via a wireless communication module 50 of the robotic system 100, a vehicle sensor signal of the at least one vehicle sensor 32 to the robot controller 16.

Apart from that, step S3 may optionally comprise generating, by the robot controller 16, a moving safety zone 36 based on a vehicle sensor signal of the at least one vehicle sensor 32 while the at least one vehicle 30 moves within the robot safety zone 24, and supplementing, by the robot controller 16, the robot safety zone 24 with the moving safety zone 36.

Further, step S3 may optionally comprise disabling and/or muting, with the robot controller 16, at least a part of the robot safety zone 24, e.g. based on disabling the at least one robot sensor 22 of the robot sensor system 20 and/or based on discarding a robot sensor signal of the at least one sensor 22 of the robot sensor system 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A robotic system, the robotic system comprising:
   at least one robot;
   a robot controller configured to control an operation of the at least one robot;
   a robot sensor system comprising at least one robot sensor, the robot sensor system being coupled to the robot controller and configured to detect a presence of an object in a robot safety zone, the robot safety zone at least partially surrounding the at least one robot and comprising an entering area and an exiting area; and
   at least one automated vehicle configured to supply the at least one robot,
   wherein the at least one automated vehicle comprises at least one vehicle sensor configured to detect a presence of an object in a vehicle safety zone, the vehicle safety zone at least partially surrounding the at least one automated vehicle,
   wherein the robot controller is configured to:
   determine an entry of the at least one automated vehicle into the robot safety zone,
   adjust at least a part of the robot safety zone based on determining the entry of the at least one automated vehicle into the robot safety zone, the adjusting comprising temporarily muting the entering area and merging the robot safety zone and the vehicle safety zone,
   determine that the at least one automated vehicle is fully inside the robot safety zone,
   based on determining that the at least one automated vehicle is fully inside the robot safety zone, un-mute the entering area and un-merge the robot safety zone and the vehicle safety zone,
   determine an exit of the at least one automated vehicle out of the robot safety zone, and
   based on determining that the at least one automated vehicle is exiting the robot safety zone, temporarily mute the exiting area and merge the robot safety zone and the vehicle safety zone.

2. The robotic system according to claim 1, wherein the robot controller is configured to merge the robot safety zone and the vehicle safety zone by adjusting at least one of a shape and a size of the robot safety zone.

3. The robotic system according to claim 1, wherein merging the robot safety zone and the vehicle safety zone comprises merging at least a part of the robot safety zone and at least a part of the vehicle safety zone.

4. The robotic system according to claim 1, wherein the robot controller is further configured to dynamically adjust the robot safety zone by dynamically merging at least a part of the robot safety zone and at least a part of the vehicle safety zone, while at least a part of the at least one automated vehicle moves within the robot safety zone.

5. The robotic system according to claim 1, wherein the robot controller is configured to merge the robot safety zone and the vehicle safety zone by substituting at least a part of the robot safety zone with at least a part of the vehicle safety zone.

6. The robotic system according to claim 1, further comprising:
   a communication module coupled to the robot controller and configured to receive and/or transmit a vehicle sensor signal of the at least one vehicle sensor.

7. The robotic system according to claim 6, wherein the robot controller is configured to detect a presence of an object in the robot safety zone and/or in the vehicle safety zone based on the vehicle sensor signal of the at least one vehicle sensor.

8. The robotic system according to claim 6, wherein the communication module is configured to communicate with the at least one automated vehicle using a safety-rated communication protocol.

9. The robotic system according to claim 1, wherein the robot controller is configured to temporarily mute the entering area by disabling at least a portion of the entering area and temporarily mute the exiting area by disabling at least a portion of the exiting area.

10. The robotic system according to claim 1, wherein temporarily muting the entering area comprises: disabling or deactivating the at least one robot sensor such that the robot sensor does not detect the presence of the object in the entering area; or ignoring or discarding sensor data from the at least one robot sensor indicating the presence of the objet in the entering area, and wherein temporarily muting the exiting area comprises: disabling or deactivating the at least one robot sensor such that the robot sensor does not detect the presence of the object in the exiting area; or ignoring or discarding sensor data from the at least one robot sensor indicating the presence of the objet in the exiting area.

11. The robotic system according to claim 1, wherein merging the robot safety zone and the vehicle safety zone comprises at least combining an at least one robot sensor signal of the at least one robot sensor and at least one vehicle sensor signal of the at least one vehicle sensor.

12. The robotic system according to claim 1, wherein merging the robot safety zone and the vehicle safety zone comprises at least processing an at least one robot sensor signal of the at least one robot sensor and at least one vehicle sensor signal of the at least one vehicle sensor.

13. A method of operating a robotic system comprising at least one robot, a robot controller configured to control an operation of the at least one robot, a robot sensor system comprising at least one robot sensor coupled to the robot controller to detect a presence of an object in a robot safety zone, the robot safety zone at least partially surrounding the at least one robot and comprising an entering area and an exiting area, and at least one automated vehicle for supplying the at least one robot, the at least one automated vehicle comprising at least one vehicle sensor for detecting a presence of an object in a vehicle safety zone, the vehicle safety zone at least partially surrounding the at least one automated vehicle, the method comprising:
    moving the at least one automated vehicle at least partly into the robot safety zone;
    determining, with the robot controller, an entry of the at least one automated vehicle into the robot safety zone; and
    adjusting, with the robot controller based on determining the entry of the at least one vehicle into the robot safety zone, at least a part of the robot safety zone by temporarily muting the entering area and merging the robot safety zone and the vehicle safety zone,
    determining, with the robot controller, that the at least one automated vehicle is fully inside the robot safety zone,
    further adjusting, with the robot controller based on determining that the at least one automated vehicle is fully inside the robot safety zone, at least the part of the robot safety zone by un-muting the entering area and un-merging the robot safety zone and the vehicle safety zone,
    determining, with the robot controller, an exiting of the at least one automated vehicle out of the robot safety zone, and
    further adjusting, with the robot controller based on determining that the at least one automated vehicle is exiting the robot safety zone, at least the part of the robot safety zone by temporarily muting the exiting area and merging the robot safety zone and the vehicle safety zone.

14. The method according to claim 13, wherein merging the robot safety zone and the vehicle safety zone comprises adjusting at least one of a shape and a size of the robot safety zone.

15. The method according to claim 13, wherein merging the robot safety zone and the vehicle safety zone comprises merging at least a part of the robot safety zone and a part of the vehicle safety zone.

16. The method according to claim 15, wherein merging the part of the robot safety zone and the part of the vehicle safety zone comprises substituting at least a part of the robot safety zone with at least a part of the vehicle safety zone.

17. The method according to claim 16, wherein substituting the at least part of the robot safety zone with the at least part of the vehicle safety zone comprises using and/or processing, with the robot controller, a vehicle sensor signal of the at least one vehicle sensor to detect a presence of an object in the vehicle safety zone and/or in the robot safety zone.

18. The method according to claim 13, wherein the method further comprises dynamically merging at least a part of the robot safety zone and at least a part of the vehicle safety zone while at least a part of the at least one automated vehicle moves within the robot safety.

* * * * *